United States Patent [19]

Hujsak et al.

[11] 4,393,541

[45] Jul. 19, 1983

[54] HINGE FOR DEPLOYABLE STRUCTURES SELF LOCKING HINGE

[75] Inventors: Edward J. Hujsak, La Jolla; Hans M. Stocker, San Diego, both of Calif.

[73] Assignee: General Dynamics Corporation/Convair Div., San Diego, Calif.

[21] Appl. No.: 122,752

[22] Filed: Feb. 19, 1980

[51] Int. Cl.³ .............................................. E05F 1/12
[52] U.S. Cl. ........................................ 16/297; 16/291; 403/102
[58] Field of Search ................. 16/291, 290, 296, 297, 16/326, 325, 324, 327; 135/15 PQ; 248/188.6; 403/102, 229, 220

[56] References Cited

U.S. PATENT DOCUMENTS

| 283,128 | 8/1883 | Masters | 16/297 |
| 2,125,247 | 7/1938 | Roethel | 16/297 X |
| 3,187,373 | 6/1965 | Fisher | 16/327 |
| 3,221,805 | 12/1965 | Miller | 16/327 X |
| 4,111,217 | 9/1978 | Victor | 16/324 X |
| 4,131,378 | 12/1978 | Daws | 16/291 X |
| 4,193,164 | 3/1980 | Okayama | 16/297 |

FOREIGN PATENT DOCUMENTS 5590 of 1891 United Kingdom ................. 16/297

Primary Examiner—Werner H. Schroeder
Assistant Examiner—Andrew M. Falik
Attorney, Agent, or Firm—John R. Duncan; Frank D. Gilliam

[57] ABSTRACT

A two-piece hinge which is spring biased in both its folded position and in its unfolded or deployed position to provide built-in deployment power for structural members and which is provided with trigger/locking mechanisms which are held in an unlocked position when the hinge and the structural members are in their folded position and which triggers and releases the locking mechanisms to lock the hinge in its unfolded or deployed position for positive locking capability. Two trigger-locking mechanisms are used for redundancy.

11 Claims, 11 Drawing Figures

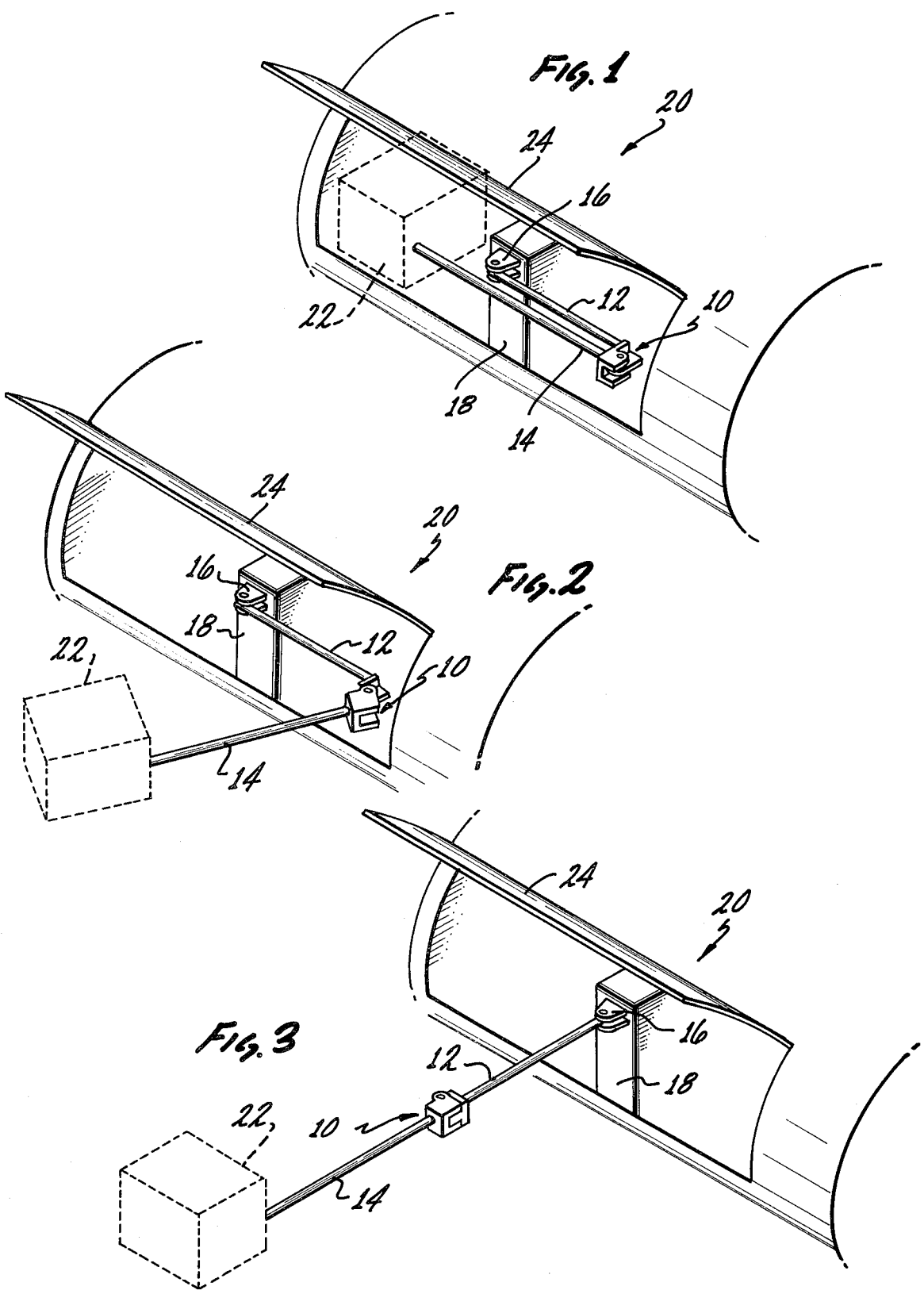

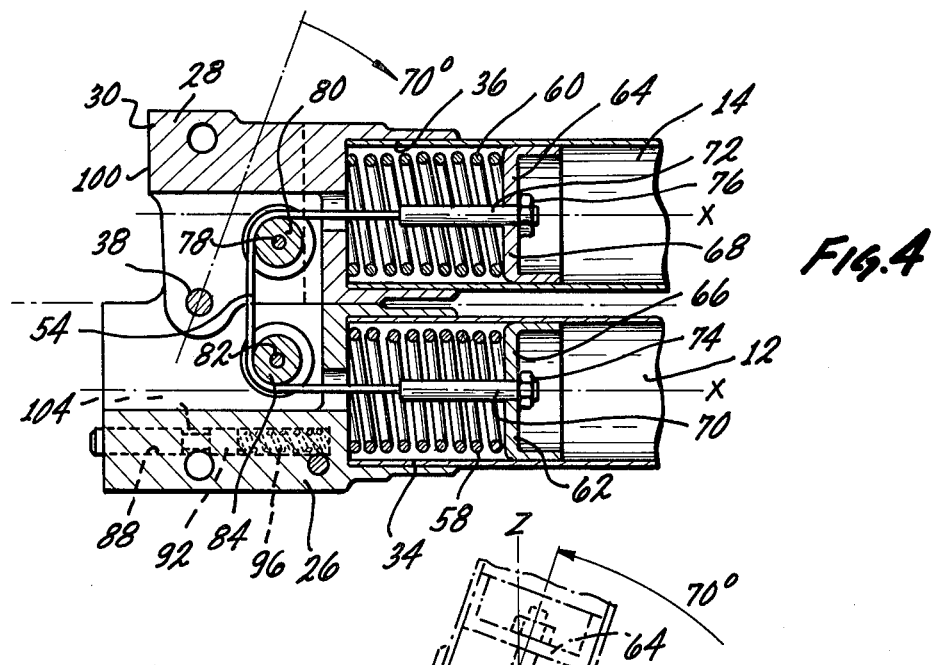
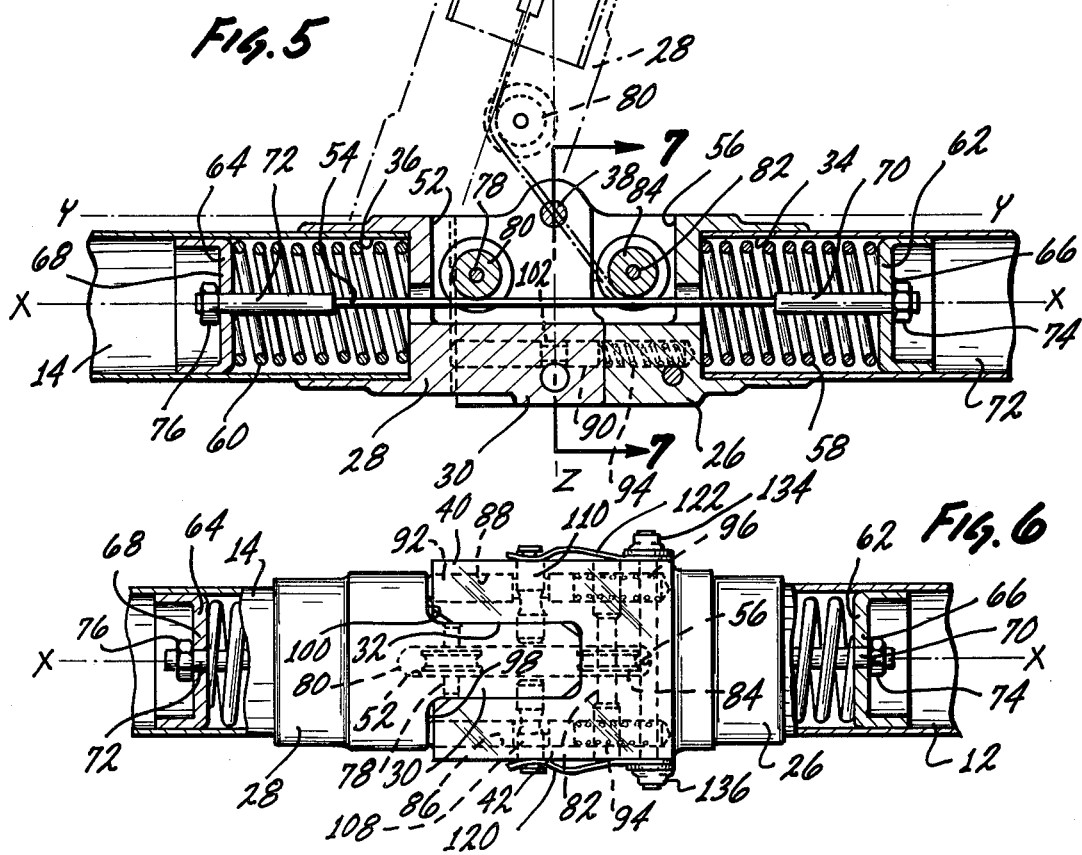

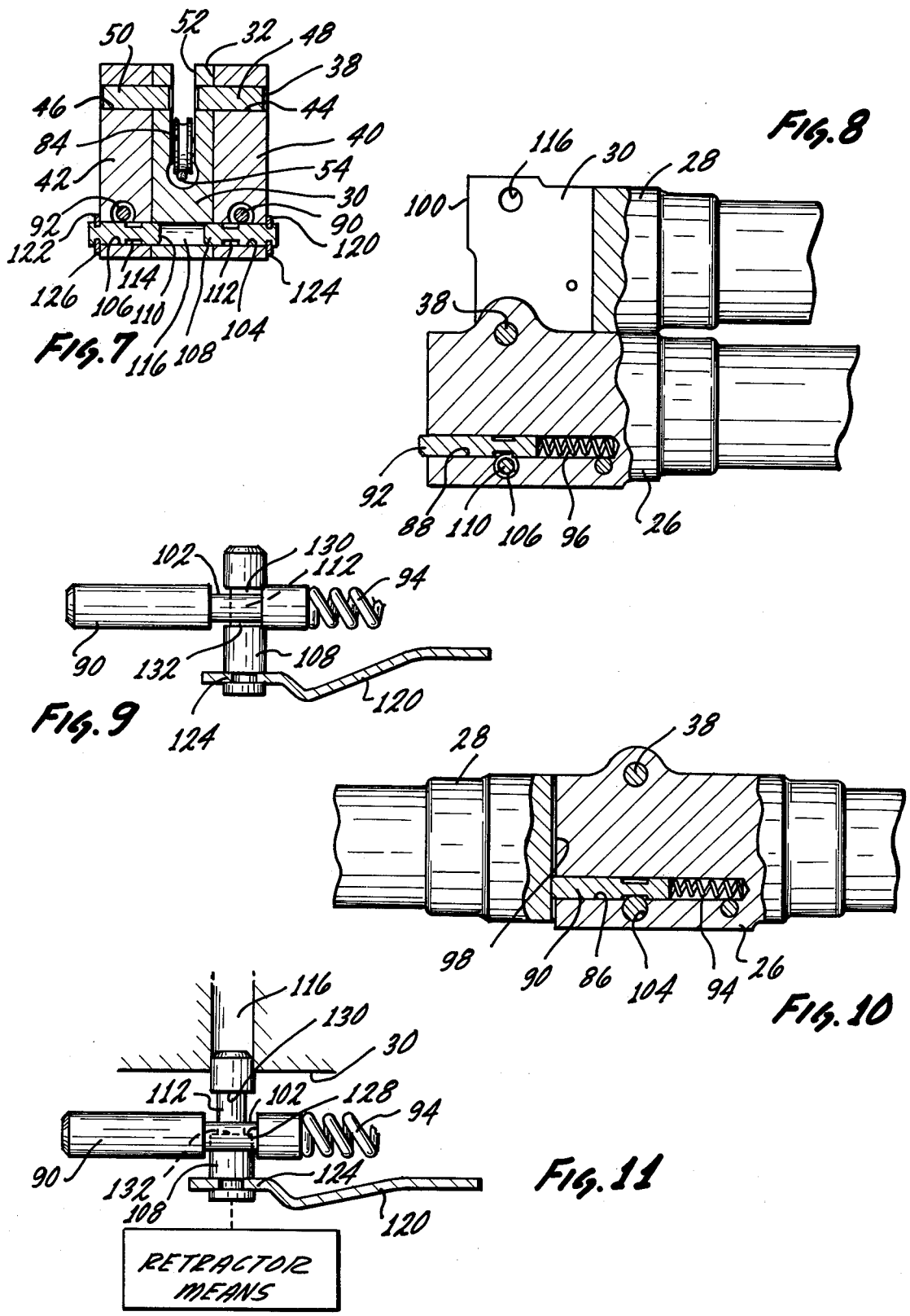

HINGE FOR DEPLOYABLE STRUCTURES SELF LOCKING HINGE

BACKGROUND OF THE INVENTION

This invention relates, in general, to hinges and, in particular, to hinges for the deployment of structures used in space vehicles, as for example, in geostationary communications platforms, in photovoltaic power modules, and in large diameter antennas.

The need for hinges for space vehicle use has long been recognized. Individual structure members of a truss type are frequently hinged together and folded to achieve efficient volumetric packaging for launch and for later deployment in space and typical examples of such use in prior art are shown in the U.S. Pat. Nos. to Wuenscher 3,520,496, to Madey 3,540,676, to Webb 3,466,085 and others. The Patent to Wuenscher and Madey additionally show a locking means for locking the deployable structures in their deployed position after launch.

Notwithstanding the foregoing, there still exists a need for a hinge having built-in deployment power, positive locking in the deployed (fully open) position, redundancy in the lock for safety purposes, the absence of slack in the deployed hinge, torsional stability, structural capability equal to the strut it is attached to, receptiveness to future robotics manipulation, light weight, low cost in quantity production and, an all purpose standard design, and it therefore is a primary object of this invention to fulfill the foregoing need.

SUMMARY OF THE INVENTION

The invention which accomplishes the foregoing objects comprises a two-piece hinge which is spring biased in both its folded position and in its unfolded or deployed position to provide built-in deployment power for structural members and which is provided with trigger/locking mechanisms which are held in an unlocked position when the hinge and the structural members are in their folded position and which triggers and releases the locking mechanisms to lock the hinge in its unfolded or deployed position for positive locking capability. Two trigger/locking mechanisms are used for redundancy.

BRIEF DESCRIPTION OF THE DRAWINGS

FIGS. 1, 2 and 3 are simplified schematic illustrations of structural members pivotally attached to a vehicle and to each other and shown in their folded or back to back position and their deployment to a fully open position;

FIG. 4 is an elevational cross sectional view illustrating the details of the hinge in its folded position;

FIG. 5 illustrates, in phantom, the hinge in between the fully folded and its fully open position which is its overcenter position or load reversal position where the cable passes through the hinge centerline and also illustrates the hinge in its fully open or structure deployed position;

FIG. 6 is a bottom view of the hinge showing the trigger and locking mechanisms;

FIG. 7 is a cross sectional view taken along line 7—7 of FIG. 5;

FIG. 8 is a simplified view showing the trigger and the locking mechanisms with the hinge in its folded position;

FIG. 9 is a view of the trigger and locking mechanism apart from the hinge to illustrate the relationship between the two when the hinge is in a position not fully deployed;

FIG. 10 shows the hinge in its fully deployed position and the relationship of the trigger and locking mechanisms; and FIG. 11 illustrates the trigger and locking mechanisms apart from the hinge to illustrate the relationship between the two when the hinge is in its folded position.

BRIEF DESCRIPTION OF THE PREFERRED EMBODIMENT

FIGS. 1, 2 and 3, show a schematic representation of one use of a hinge 10, forming the present invention, between a pair of structural members 12 and 14 pivotedly connected at one end as at 16 to a stationary member 18 of a space vehicle 20 and at the other end to a representation of a suitable mass 22 for deploying the structural members. The mass 22 is represented in FIG. 1 with the hinge and structural member folded condition about to be ejected from the space vehicle upon opening of door 24 from the space vehicle. Upon ejection, the hinge and structural members travel through a partially opened position (FIG. 2) to a fully opened or deployed position (FIG. 3). This mass 22 could be additional structural members, or any other force to deploy the structural members; the two structural members shown simply illustrate the function of the hinge 10.

Also as mentioned before, the hinge 10 in its folded position (FIG. 1) is resiliently biased so that the structural members 12 and 14 are biased toward their folded position and at one point in the deployment, such as at FIG. 2, the bias is reversed to urge the hinge to its fully deployed position as shown in FIG. 3 where the hinge is locked by the operation of trigger and locking mechanisms which will now be described in detail.

Turning first to FIGS. 4–7, the hinge 10 is shown formed of two members 26 and 28; one hinge member 28 formed with a tongue 30 which fits into a groove 32 in the second hinge member 26 to form a tongue and groove construction (FIG. 6). The two deployable structural members 12 and 14 are attached to the two hinge members in any suitable manner as by insertion into openings 34 and 36 in the ends of the hinge members opposite their tongue and groove elements.

The depth of the groove 32 is sufficient to receive the tongue 30 and the two members 26, 28 are pivotedly connected at 38 offset horizontal center line X—X of the hinge in line substantially with the outer surfaces of the two members as represented by the first hinge center line Y—Y to permit the two hinge members to swing from a folded back-to-back position (FIG. 4), in which the attached deployable structural members 12 and 14 are parallel with each other, to an unfolded or deployed position (FIGS. 5 and 6) in which the structural members 12 and 14 are in axial alignment with the center line X—X. The position of the pivotal connection is also represented by a third center line Z—Z (FIG. 5).

The bifurcations 40 and 42 formed by the groove 32 in the hinge member 26 and the tongue 30 are both apertured as at 44 and 46 (FIG. 7) to receive a pair of pins 48 and 50 to form the above mentioned pivotal connection 38. These pins 48 and 50, while extending through the bifurcations, do not extend entirely through the tongue 30 but terminate short of an additional groove 52 formed in the center of the tongue. This latter groove 52 is thinner than the groove 32, is open at the tongue top, and extends slightly below the center line X—X of the hinge to accommodate a cable 54. Similarly, hinge member 26 is also grooved as at 56 which groove opens into the groove 52 and is open at its top and forms a continuation of groove 52 when the hinge is in its unfolded position (See FIG. 6).

The cable 54 is spring loaded by helical springs 58 and 60 located on the center line X—X of the hinge and structural members which engage the hinge members at the bottoms of openings 34 and 36 and engage spring tensioning devices 62 and 64 at the other end so that the cable spring bias may be adjusted. Each of the spring tensioning devices 62 and 64 comprise flanged washers 66 and 68 apertured at their centers to receive threaded bolts 70 and 72 on which adjusting nuts 74 and 76 are placed. The threaded bolts 70 and 72 are attached to each end of the cable, and by turning either or both of the adjusting nuts 74 and 76, the spring tension on the cable can be adjusted. Actually in the embodiment shown, the spring tensioning devices 62 and 64 extend into the hollow structural members, although this is a matter of choice, since the hinge members could easily be lengthened or the springs shortened, or both, so that the springs may be fully within the hinge members.

The tongue 30 of hinge member 28 is apertured above and partially below the center line x—x and to the left of the center line z—z of the pivot point of the hinge to receive a pin 78 which forms an axle for a first pulley 80 which engages the cable 54. The pulley 80 is narrow enough to be operable within the tongue groove 52 and of a diameter so that, in the hinge folded position, it engages the cable at the hinge center line X—X. Similarly, the bifurcations 40 and 42 of the hinge member 26 are apertured the same distance above and partially below the center line X—X and to the right of the center line Z—Z of the pivot point of the hinge to receive a pin 82 which serves as the axle for the second pulley 84, of the same size as the first pulley 80, which also engages the cable at the center line of the hinge in the latter's folded position. Again, the second pulley 84 is narrow enough to be operable within the grooves 52 and 54.

Thus far described, it can be seen that the cable 54 is free to move through the pivotal connection 38 of the hinge by reason of the grooves 52 and 56 and between the two short pins 48 and 50 which serve as the pivotal connection 38 for the hinge. The relationship of the pivotal connection 38 and the pulleys 80 and 84 is such that during the pivotal operation of the hinge, the cable 54 passes through the pivot point and at some selected angle, over center, the spring biased cable acts to urge the hinge members into their folded position. On the other hand, movement of the hinge from a folded position to a selected angle less than midway of the path of travel from the folded to the unfolded position activates the spring to urge the hinge members into their unfolded or deployed position. In the embodiment illustrated, the angle in which the hinge element 28 crosses over from the folded to the unfolded position is approximately 70° from the center line X—X (see FIG. 5). At this 70° position, the groove of pulley 80 has passed through center line Z—Z. On the other hand, when the hinge element 28 travels from the fully folded hinge position to the fully open position at the same angle 70°, i.e., when the axle 78 of pulley 80 passes through center line Z—Z, the bias will be toward the fully open position.

As herein above mentioned, one of the advantages of this hinge is that it is provided with a locking mechanism in its unfolded position to provide a structural strength at this connection for the structural members. The trigger mechanism and locking mechanism for locking the hinge will now be described with particular reference to FIGS. 7-10.

The bifurcations 40 and 42 of the hinge element 26 are provided with longitudinal apertures 86 and 88, i.e., these apertures are parallel with the center line X—X but are on the side of the center line opposite the pivot point 38 to receive trigger pins 90 and 92 which are resiliently biased towards the end of the bifurcations by helical springs 94 and 96. Actually in all but the fully unfolded position of the hinge, the ends of the trigger pins extend beyond the ends of the bifurcations so as to be engageable by shoulders 98 and 100 formed by the tongue 30 in hinge member 28. These trigger pins are provided with reduced portions 102 and 104 which coincide generally with a pair of apertures 104 and 106 located transverse to the longitudinal apertures 86 and 88 are slightly below to receive a pair of shorter locking pins 108 and 110 also having reduced central portion 112 and 114 to cooperate with the reduced central portions 102 and 104 of the trigger pins. The tongue 30 of hinge member 28 is also provided with an aperture 116 which corresponds to the transverse apertures 104 and 106 when the hinge is in its unfolded position, to receive the heads of the locking pins 108 and 110. These locking pins 108 and 110 are also biased by a pair of leaf springs 120 and 122 which engage the pins as at 124 and 126 (FIGS. 9 and 11) and are fastened as at 134 and 136 (FIG. 6) to the outer sides of the bifurcations. These leaf springs urge the locking pins towards the aperture 116 but the locking pins are prevented from moving toward the aperture 116 in any position except the fully unfolded or deployed position.

As mentioned before, the ends of the trigger pins extend beyond the ends of the bifurcations and in this position, the shoulders 128 formed by the reduced central portions 102 and 104 (one pin being shown in FIGS. 9 and 11), engage the shoulders 130 and 132 of locking pins 108 and 110 (one shown in FIGS. 9 and 10). Thus positioned, the locking pins are held in their inoperative position.

When the hinge reaches its fully deployed position, the longitudinal trigger pins 90 and 92 are engaged by the shoulders 98 and 100 and are urged toward their inward position against their respective springs 94 and 96 at which time the locking pins 108 and 110 are freed for travel. The leaf springs 120 and 122 of the locking pins urge the locking pins inwardly to enter the aperture 116 in the tongue thus locking the hinge in its unfolded or fully open position.

It is to be noted that there are two locking pins and two trigger pins for redundancy to insure that the hinge is in locked position by at least one set of trigger and locking pins.

Finally, while the foregoing describes the hinge and structural member going from a folded to an unfolded deployed position, the hinge is capable of going from a fully deployed to a folded position with the mass 22 acting in the opposite direction from that shown in FIGS. 1-3. In this case, the pin retractor means (FIG. 11) would withdraw the locking pins, thus reactivating the trigger pins and as the hinge 80 passes through virtual center line Z—Z, the bias of the cable would reverse and act to urge the hinge towards the fully folded portion.

What is claimed is:

1. A hinge having structural members attached thereto for positioning said structural members in a folded, back-to-back position and in an aligned deployed position comprising, a pair of hinge members pivotly connected together, said hinge members form a bifurcated hinge construction, biasing means connecting hinge members together and biasing said hinge members in both a folded and an unfolded position, said biasing means is located on the center line of said structural members and wherein said pivotal connection is offset said center line and located to allow said hinge members to fold to a position where said hinge members are back-to-back, a trigger mechanism and a locking mechanism on said hinge members, said trigger mechanism holding said locking member in an inoperative position when said hinge is in all but its unfolded position and triggering said locking mechanism to lock said hinge members together when said hinge is in its unfolded position.

2. The hinge as claimed in claim 1 wherein said biasing means comprises spring means, one in each hinge member, together with means connecting said spring means to each other.

3. The hinge as claimed in claim 2 wherein said spring means has adjusting means in each hinge member for adjusting bias of said spring means.

4. The hinge as claimed in claim 3 wherein said means connecting said spring means together is cable means, said hinge further including means forming part of said pivotal connection for passing said cable means through said pivotal connection when said hinge members pass through a predetermined angle in their pivotal movement from a folded to an unfolded position and visa versa.

5. The hinge as claimed in claim 4 further including a pair of pulley means in each hinge member whose axes of rotation are offset said pivotal connection but whose peripheral grooves are on the center line of said structural members and wherein said cable engages said pulley means in each of said hinge members.

6. The hinge as claimed in claim 5 when both said pulley means are on the same side of said pivotal connection when said hinge members are in their folded position and wherein said pulley means move so that said pivotal connection is between each of said pulley means as said hinge members move and are at their unfolded position.

7. The hinge as claimed in claim 6 wherein said trigger mechanism comprises trigger pin means, means on one of said hinge members for moving said trigger pin means from said inoperative position to a second position to release said locking mechanism when said hinge members reach their unfolded position thus locking said structural members in a fully deployed position.

8. The hinge as claimed in claim 7 wherein said locking mechanism comprises locking pin means operatively connected to the trigger pins means, means for urging said locking pins toward a locking position, said trigger pin means holding said locking pin means in their inoperative position in all but the hinge folded position and wherein said trigger pin means permits movement of said locking pins when said hinge members reach their unfolded position.

9. The hinge as claimed in claim 8 wherein said trigger pin means includes at least one trigger pin cooperating with at least one locking pin so that one of said locking pins will lock said hinge members together if any other trigger and locking pin means are inoperative.

10. The hinge as claimed in claim 8 wherein said bifurcated structural relationship of said hinge members includes a tongue member engagable in a groove between said bifurcations, said trigger pin means being located in said bifurcations and engagable against said shoulder formed by said tongue member and wherein said tongue member includes an aperture to receive said locking pin means when said locking pin means are allowed to move by the operation of said trigger pin means.

11. The hinge as claimed in claim 10 where means are provided for unlocking said locking mechanism to permit said hinge to move from its unfolded position to its folded position.

* * * * *